United States Patent [19]

Shimasaki

[11] Patent Number: 5,219,652
[45] Date of Patent: Jun. 15, 1993

[54] MAGNETIC RECORDING SYSTEM

[75] Inventor: Yukihiro Shimasaki, Sanda City, Japan

[73] Assignee: Matsushita Electric Industrial Co., Ltd., Kadoma, Japan

[21] Appl. No.: 676,986

[22] Filed: Mar. 29, 1991

[30] Foreign Application Priority Data

Apr. 11, 1990 [JP] Japan ................. 2-95838

[51] Int. Cl.$^5$ .................... B32B 5/16; B32B 9/00; G11B 5/66; G11B 5/72
[52] U.S. Cl. .................... 428/323; 428/329; 428/408; 428/694; 428/900
[58] Field of Search ............... 428/329, 408, 323, 694, 428/695, 900

[56] References Cited

U.S. PATENT DOCUMENTS

| | | | |
|---|---|---|---|
| 4,076,890 | 2/1978 | Yamada et al. | 428/331 |
| 4,434,210 | 2/1984 | Nakajima et al. | 428/405 |
| 4,475,946 | 10/1984 | Matsufugi et al. | 428/694 |
| 4,734,325 | 3/1988 | Ryoke et al. | 428/694 |
| 4,734,326 | 3/1988 | Nishimatsu et al. | 428/694 |
| 4,761,331 | 8/1988 | Ogino et al. | 428/694 |
| 4,770,932 | 9/1988 | Matsumoto et al. | 428/323 |
| 4,789,591 | 12/1988 | Nakamura et al. | 428/694 |
| 4,798,755 | 1/1989 | Yamada et al. | 428/694 |
| 5,008,147 | 4/1991 | Ryoke et al. | 428/694 |

OTHER PUBLICATIONS

Patent Abstracts of Japan, vol. 9, No. 122, May 1985, Kokai No. 60-7, 612 English Abstract.
Patent Abstracts of Japan, vol. 11, No. 340, Nov. 1987, Kokai No. 62-121,925 English Abstract.
Patent Abstracts of Japan, vol. 10, No. 15, Jan. 1986, Kokai No. 60-170,026 English Abstract.
Patent Abstracts of Japan, vol. 9, No. 190, Aug. 1985, Kokai No. 60-57,529 English Abstract.
Patent Abstracts of Japan, vol. 10, No. 341, Nov. 1986, Kokai No. 61-142,529 English Abstract.

Primary Examiner—Paul J. Thibodeau
Assistant Examiner—Leszek Kiliman
Attorney, Agent, or Firm—Cushman, Darby & Cushman

[57] ABSTRACT

In the magnetic recording medium, the back coat layer includes the spherical particles having a diameter in the range of from 0.6 μm to 1.2 μm, and the amount of spherical particles in the back coat layer is in the range of from 0.05 weight % to 0.5 weight %. Fine studs are formed on the surface of the back coat layer, and it results in low coefficient friction of the back coat layer. In order to increase the binding power between the spherical particles and the binder resin(s), and to give good sliding characteristic to the back coat layer, a surface treatment is made on the spherical particles by using a silane group coupling agent, a titanate group coupling agent and/or a fatty acid having at least 12 carbon atoms.

7 Claims, 1 Drawing Sheet

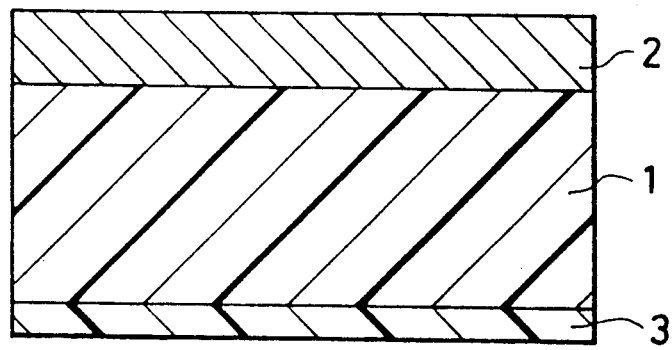

MAGNETIC RECORDING SYSTEM

FIELD OF THE INVENTION AND RELATED ART STATEMENT

1. Field of the Invention

The present invention relates to a magnetic recording medium for use in an audio apparatus, a video apparatus, a computer and the like.

2. Description of the Related Art

In recent years, a video apparatus for realizing high quality picture and a DAT (Digital Audio Taperecorder) have been developed. In this equipment, in order to improve electromagnetic transducing characteristics in short wave length region, a very smooth finish of a magnetic layer surface of a magnetic recording medium is required. The following is a description of a magnetic tape which is a typical example of the magnetic recording medium. A base film used in the magnetic tape must have a smooth surface for improvement of electromagnetic transducing characteristics. But, when both the magnetic layer surface and the base film surface are made so smooth, frictional performance of the magnetic tape becomes poor. That is, the coefficient of friction becomes exceedingly large and unstable and runability in the actual use becomes unacceptable. In order to improve the runability, investigations led to the formation of a back coat layer on the side which is opposite to the side covered by the magnetic layer of the magnetic tape. The back coat layer is formed by dispersing a filler of inorganic fine powder e.g. carbon black, calcium carbonate, zinc oxide, barium sulfate or the like in resin(s) for a binder (hereinafter it is abbreviated to binder resin(s)).

Preferably the back coat layer should have the following features:

(a) Low and stable coefficient of friction as mentioned above;

(b) Low "surface resistance*" of below $10^7 \Omega$ making it suitably antistatic; and (* the "surface resistance" is defined in the Magnetic tape standard "MTS-205 Method for testing a video tape" published by MAGNETIC-MEDIA INDUSTRIES ASSOCIATION OF JAPAN)

(c) High transmission factor for a light in a certain range, which is required for detecting an end point of the magnetic tape.

It has been proposed to add lubricant or spherical particles having a large diameter (for example, spherical particles of formaldehyde condensation hardening resin or thermal black which includes particles having diameters above 0.5 $\mu$m) in the back coat layer in order to obtain a low and stable coefficient of friction of the back coat layer. Examples of the method for such addition are shown, for instance in the gazette of the Japanese examined patent applications (Tokko) Sho 60-1622, Sho 60-7612, Sho 61-11923, Sho 57-111828, Sho 61-104327 or Sho 62-8328.

In recent years, a video tape recorder combined with a camera in an integral body and a portable apparatus has been developed, and environmental condition for this apparatus becomes more severe. For instance, it is required to work under a wide environmental temperature range. Thus stable runability of the magnetic tape is necessary even under the above-mentioned severe environmental condition. In order to realize the stable runability, it is important to decrease the coefficient of friction. And, generally, it becomes possible to decrease it by increasing surface roughness of the back coat layer or by adding a lubricant therein.

But, the considerably smooth surface of the magnetic layer is necessary for improved electromagnetic transducing characteristics in short wave length region as afore-mentioned. Further, a hardened surface is made on the magnetic tape being wound around a reel under a high temperature, and the back coat layer comes in touch with the surface of the magnetic layer under such a heavy pressure that the roughness of the surface of the back coat layer is transcribed onto the surface of the magnetic layer. It results in deteriorated surface of the magnetic layer. Thus, it is necessary to make the surface of the back coat layer as smooth as possible for the above-mentioned reason.

It is a difficult problem to obtain both smooth surface and low coefficient of friction of the back coat layer of the conventional magnetic recording medium. Desired low coefficient of friction is realized by addition of a lubricant such as a low molecular weight compound to the back coat layer, but at the same time, adhesive property of the back coat layer to the base film becomes poor, and further, strength of the back coat layer is decreased.

Moreover, under high environmental temperature, undesirable new problems, such as an adhesion of the back coat layer to the magnetic layer occurs owing to addition of the lubricant. When the coefficient of friction is adjusted by the lubricant, since the lubricant has altered properties at different temperatures, undesirable temperature dependency of the coefficient of friction is shown.

OBJECT AND SUMMARY OF THE INVENTION

The present invention is intended to solve the above-mentioned problems, and a purpose of the present invention is to provide a magnetic recording medium having improved electromagnetic transducing characteristics, runability and durability.

These objects are accomplished by a magnetic recording medium comprising:

a non-magnetic substrate;

a magnetic layer formed on the non-magnetic substrate; and a back coat layer including spherical particles which are surface-treated with an agent for giving lubricity, the spherical particles having a diameter in the range of from 0.6 $\mu$m to 1.2 $\mu$m and the amount of the spherical particles in the back coat layer being in the range of from 0.05 weight % to 0.5 weight %.

The surface treated spherical particles as a filler of inorganic fine powder are added in the back coat layer for the purpose of lowering and stabilizing the coefficient of friction of the back coat layer, and the above-mentioned range as to the diameter and the range as to the amount of the spherical particles are determined for keeping both a suitable small surface roughness of the back coat layer and suitable low coefficient of friction thereof. Thereby the back coat layer has suitable small surface roughness and low and stable coefficient of friction.

The present invention is characterized in the spherical particles having a diameter in the range of from 0.6 $\mu$m to 1.2 $\mu$m. These particles can be chosen properly from; spherical particles of silicon dioxide, thermal black, fine particles of melamine formaldehyde condensation product and the like. An example of the spherical particles of silicon dioxide is "SEAHOSTAR type KE- P70" (trade name) (having a 0.7 μm diameter) supplied by NIPPON SHOKUBAI KAGAKU KOGYO CO., LTD. JAPAN or "SEAHOSTAR type KE-P100" (trade name) (having a 1.0 μm diameter) supplied by the same. An example of the fine particles of melamine formaldehyde condensation product is "EPOSTAR type S12" (trade name) (having a 1.2 μm diameter) supplied by the same. An example of the thermal black is "SEVACARB MT" (trade name) (having a mean diameter of 0.67 μm and the range of diameter is from 0.10 μm to 1.5 μm) supplied by Columbian Chemical Company U.S.A. The particle size distribution of the thermal black is broader than the particle size distribution of the above-mentioned other particles.

When the above-mentioned spherical particles are added in the back coat layer, numerous studs are formed on the surface of the back coat layer, resulting in a small touching area with posts and the like of a video tape. And low coefficient of friction is achieved by the small touching area of the back coat layer. The low coefficient of friction owing to such shape of the surface (i.e. numerous fine studs) has little temperature dependency in comparison with the coefficient of friction controlled by the lubricant.

Further, both diameter of the spherical particles and added amount of the spherical particles are controlled in such respective suitable ranges that the back coat layer never has large surface roughness which exerts an undesirable bad influence upon the magnetic layer owing to afore-mentioned surface-roughness-transcription.

As described above, it can be seen that the coefficient of friction of the black coat film is determined by these spherical particles.

In order to obtain stable coefficient of friction even after repeated running of the magnetic tape, it is important that the surface of the spherical particles has good sliding characteristic, since the surface of them operates as a touching face. And further, it is important to prevent undesirable omission of the spherical particles by strengthening a binding power between the spherical particles and the binder resin(s). Then, a surface treatment of these spherical particles becomes effective.

Since the surface treatment is made on only a slight amount of the spherical particles which are to be added in the back coat layer, a very slight quantity of the surface treatment agent is added to the whole back coat layer. Thereby, adhesive property of the back coat layer to the base film is never poor, the strength of the back coat layer itself is never decreased and undesirable adhesion of the back coat layer to the magnetic layer never occurs, in comparison with the afore-mentioned back coat layer having addition of the lubricant as a low molecular weight compound.

The surface treatment agent used in the present invention can be chosen properly from fatty acid having at least 12 carbon atoms, for instance a lauric acid, a myristic acid a palmitic acid, a stearic acid, an oleic acid, a behenic acid and the like only, in order to give a lubricity to the spherical particles. It is possible to use only one of these acids without additive such as a coupling agent, to obtain sufficient effect. But it is preferable to take a combined use of the acid and a coupling agent having an effect for increasing the binding power between the spherical particles and the binder resins.

Coupling agents for the combined use includes; silane group coupling agents, for instance p-[N-(2-aminoethyl)aminomethyl]phenethyltrimethoxysilane; N-(2-aminoethyl)-3-aminopropylmethyldimetoxysilane; N-(2-aminoethyl)-3-aminopropyltrimethoxysilane; 1-(3-aminopropyl)-1,1,3,3,3-pentamethyldiloxane; 3-aminopropyltriethoxysilane; 3aminopropyltris(trimethylsiloxy)silane; γ-(2-aminoethyl)aminopropyltrimethoxysilane; γ-(2aminoethyl)aminopropylmethyldimethoxysilane; γ-glycidoxypropyltrimetoxysilane; γ-mercaptopropyltrimethoxysilane and the like; and titanate group coupling agents for instance isopropyltriisostearoyltitanate; isopropyltris(diocthylpyrophosphate)titanate; isopropyltri(N-aminoethyl-aminoethyl)titanate; tetraocthylbis(ditridecylphosphate)titanate; bis(diocthylpyrophosphate)oxyacetatetitanate; bis(diocthylpyrophosphate)ethylenetitanate; isopropyltrioctanoyltitanate; isopropyltridecylbenzensulfonyltitanate; isopropyltri(diocthylphosphate)titanate; tetrapropylbis(dioctylphosphate)titanate and the like.

In the event that one of the above-mentioned coupling agents is used without an acid, a sufficient effect for a good sliding characteristic is obtainable. As to the coupling agent having no long-chain alkyl group, however, the combined use with the afore-mentioned fatty acid is more preferable.

There are a several ways for the surface treatment. For instance, the following procedure is elucidated as an example:

STEP (A) Spherical particles are thrown into a planetary mixer;

STEP (B) The surface treatment agent is added little by little, while the fine particles are mixed by rotation of blades;

STEP (C) Hot water at 50° C. is flown in a cooling jacket of the planetary mixer vessel during mixing; and STEP (D) The mixing is made for two hours after addition of the surface treatment agent.

The amount of the added surface treatment agent varies with the surface area of the spherical particles. The preferable amount of the agent is in the range of from 0.5 parts to 3 parts per 100 parts by weight of the spherical particles. And, hereinafter parts of components are all by weight.

In the configuration of the magnetic tape of the present invention, the magnetic layer is formed on a side of the non-magnetic base film, and the back coat layer is formed on the side, which is opposite to the side coated by the magnetic layer, of the base film. A slight amount of the spherical particles is added in the back coat layer to obtain both adequate surface roughness and low coefficient of the friction. Further, since the surface treatment is made to prevent omission of the spherical particles and to achieve good lubricity of the same, stable runability during many repetitions of tape running is obtained. Thus, the magnetic recording medium having improved electromagnetic transducing characteristic and durability in running is obtained.

From results of evaluation tests of the examples, the coefficient of friction shows little temperature dependency, and runability of the examples is excellent. Neither scratch, wear nor deformation is observed, thus excellent durability is obtained.

Since the filler which contains spherical particles obtained through the surface treatment is added in the back coat layer, in the present invention, low and stable coefficient of friction is obtained: and further there is no temperature dependency of the coefficient of friction, so that runability and durability of the magnetic recording medium are excellent under all environmental condition from a low temperature to a high temperature.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

Attached FIGURE is a cross-sectional view of a video tape sample of Example 1 embodying the present invention.

It will be recognized that the FIGURE is schematic representation for purpose of illustration and does not necessarily depict the actual relative size or location of the elements shown.

DESCRIPTION OF THE PREFERRED EMBODIMENTS

The present invention is elucidated in detail with reference to the accompanying drawing and the following examples and comparison examples of video tapes.

EXAMPLE 1

Attached figure is a cross-sectional view of a video tape sample of this Example 1 of the present invention. In the figure, a magnetic layer 2 is formed on a non-magnetic base film 1, and a back coat layer 3 is formed on the side, which is opposite to the side of the magnetic layer 2, of the base film 1 by applying a coating material for the back coat layer.

The coating material herein referred to as B for the back coat layer was prepared by 30 hours' mixing and dispersion of the following materials in a ball mill.

| | (A) Binder resins: | |
|---|---|---|
| (A-1) | Nitrocellulose*[1] and | 43 parts |
| (A-2) | Polyurethane resin (Type "UR-8200" which is supplied by TOYOBO CO., LTD. JAPAN). | 43 parts |
| | (B) Inorganic fillers: | |
| (B-1) | Carbon black (Type "MA-7B", which is supplied by MITSUBIBHI KASEI CORPORATION JAPAN) and | 100 parts |
| (B-2) | "DAIPYROXIDE BLUE type #9410" (trade name) (which is supplied by DAINICHISEIKA COLAR & CHEMICALS MFG. CO., LTD. JAPAN), | 5 parts |
| | (C) Spherical particles after a surface treatment*[2] | |
| (C-1) | "SEAHOSTAR type KE-P100" (trade name) (which is supplied by NIPPON SHOKUBAI KAGAKU KOGYO CO., LTD. JAPAN), | 0.1 parts (0.05 weight %)*[3] |
| | (D) Organic solvents: | |
| (D-1) | Methyl ethyl ketone | 200 parts |
| (D-2) | Toluene and | 200 parts |
| (D-3) | Cyclohexanone | 60 parts. |

*[1]Type "BTH1/8", which is supplied by Asahi Chemical Industry Co., Ltd. JAPAN)
*[2]The surface treatment was made by using 1.5 parts of isopropyltriisostearoyltitanate per 100 parts of the "KE-P100".
*[3]0.1 parts of the spherical particles corresponds 0.05 weight of the whole back coat layer.

Next, video tape samples of Example 1 were made by the following procedure;

Step (a) A magnetic coating material including ferromagnetic fine powder was applied on a 10-μm thick polyethylene telephthalate film of the non-magnetic base film 1, dried and subjected to a calendering process to form a 3.5-μm thick magnetic layer 2;

Step (b) Admixing of the following materials are made well to make an admixture:

| | |
|---|---|
| The coating material B | 1000 parts |
| A polyisocyanate compound (resistered trademark "CORONATE-L" which is supplied by NIPPON POLYURETHANE INDUSTRY CO., LTD. JAPAN and has 50 weight % of solid content) | 50 parts |
| Methyl ethyl ketone and, | 250 parts |
| Toluene | 250 parts; |

Step (c) The admixture was applied on the side, which is opposite to the side coated by the magnetic layer 2, of the base film 1 and dried to form a 0.7 μm thick back coat layer 3; and Step (d) The applied film was slit to give ½ inch video tape of samples, which are set in video tape cassettes.

EXAMPLE 2

Video tape samples of this Example 2 were made by the same procedure as that of the Example 1 except that amount of the spherical particles added in the coating material (M) was increased to 0.2 parts. The 0.2 parts of the spherical particles corresponds 0.1 weight % of the whole back coat layer. The surface treatment for the spherical particles was made similarly to the Example 1.

EXAMPLE 3

Video tape samples of this Example 3 were made by the same procedure as that of the Example 1 except that 0.3 parts of "SEAHOSTAR tape KE-P70" (which is supplied by NIPPON SHOKUBAI KAGAKU KOGYO CO., LTD. JAPAN) was used as the spherical particles instead of the "SEAHOSTAR type KE-P100". The 0.3 parts of the spherical particles corresponds 0.15 weight % of the whole back coat layer. The surface treatment for the spherical particles was made similarly to the Example 1.

EXAMPLE 4

Video tape samples of this Example 4 were made by the same procedure as that of the Example 1 except that 0.6 parts of the "SEVACARB MT" was used as the spherical particles instead of the "SEAHOSTAR type KE-P100". The "SEVACARB MT" includes 40 weight % of the particles in the diameter range of from 0.6 μm to 1.2 μm due to its wide particle size distribution. Thereby the particles in the above-mentioned range is 0.12 weight % of the whole back coat layer. The surface treatment for the spherical particles was made similarly to the Example 1.

EXAMPLE 5

Video tape samples of this Example 5 were made by the same procedure as that of the Example 1 except that 1.5 parts of the "SEVACARB MT" was used as the spherical particles instead of the "SEAHOSTAR type KE-P100". The particles in the diameter range from 0.6 μm to 1.2 μm is 0.3 weight % of the whole back coat layer. The surface treatment for the spherical particles was made similarly to the Example 1.

EXAMPLE 6

Video tape samples of this Example 6 were made by the same procedure as that of the Example 1 except that 2.4 parts of the "SEVACARB MT" was used as the spherical particles instead of the "SEAHOSTAR type KE-P100". The particles in the diameter range from 0.6 μm to 1.2 μm is 0.48 weight % of the whole back coat layer. The surface treatment for the spherical particles was made similarly to the Example 1.

EXAMPLE 7

Video tape samples of this Example 7 were made by the same procedure as that of the Example 4 except that the surface treatment for the spherical particles was made by using 1.5 parts of myristic acid instead of isopropyltriisostearoyltitanate per 100 parts of "SEVACARB MT".

EXAMPLE 8

Video tape samples of this Example 8 were made by the same procedure as that of the Example 4 except that the surface treatment for the spherical particles was made by using both 1.0 parts of myristic acid and 0.5 parts of 3-aminopropyltriethoxysilane instead of isopropyltriisostearoyltitanate per 100 parts of "SEVACARB MT".

Comparison example 1

Video tape samples of this Comparison example 1 were made by the same procedure as that of the Example 1 except that the spherical particles were not added in the coating material [B].

Comparison example 2

Video tape samples of this Comparison example 2 (wherein the spherical particles having smaller diameter were used in the back coat layer) were made by the same procedure as that of the Example 3 except that 0.3 parts of the "SEAHOSTAR type KE-P30" having a 0.3 μm average diameter (which is supplied by NIPPON SHOKUBAI KAGAKU KOGYO CO., LTD. JAPAN) was used instead of the "SEAHOSTAR type KE-P70".

Comparison example 3

Video tape samples of this Comparison example 3 (wherein relatively larger amount of the spherical particles were used in the back coat layer) were made by the same procedure as that of the Example 1 except that 1.5 parts of the same "SEAHOSTAR type KE-P100" was used instead of the 0.1 parts of the same. The 1.5 parts of the "SEAHOSTAR type KE-P100" is 0.75 weight % of the whole back coat layer.

Comparison example 4

Video tape samples of this Comparison example 4 (wherein the spherical particles having larger diameter were used in the back coat layer) were made by the same procedure as that of the Example 1 except that 0.1 parts of the "EPOSTAR type MS" having a 2.0 μm average diameter (which is supplied by NIPPON SHOKUBAI KAGAKU KOGYO CO., LTD. JAPAN) was used instead of the "SEAHOSTAR type KE-P100".

Comparison example 5

Video tape samples of this Comparison example 5 (wherein no surface treatment for the spherical particles was made) were made by the same procedure as that of the Example 4 except that the surface treatment for the spherical particles was not made. From this Comparison example 5, an effect of the surface treatment was shown.

Comparison example 6

Video tape samples of this Comparison example 6 (wherein a lubricant was added in the back coat layer) were made by the same procedure as that of the Comparison example 1 except that further, 4.5 parts of n-butyl stearate as the lubricant was added in the 1000 parts of the coating material M in the step (b). From this Comparison example 6, an influence of added lubricant was shown.

The following evaluation tests were made on different video tape samples obtained in the foregoing examples and comparison examples.

(1) Surface roughness of the back coat layer

Surface roughness of the back coat layer was measured by a non-contact type three dimensional surface roughness meter "TOPO-3D" manufactured by WYKO CO., LTD. U.S.A.

(2) Coefficient of friction of the back coat layer

The tape sample was wound on and around a post of 3 mmφ made of stainless steel at a winding angle of 180°; tension at winding-in side of the post was 20.0 g; and the sliding speed was 5 cm/sec. The coefficient of friction was obtained by measured tension at feeding-out side of the post and the tension at the winding-in side.

In order to obtain temperature dependency of the coefficient of friction, measurements were made at the environmental temperatures of 3° C., 23° C. and 40° C.

In order to test stability of the coefficient of friction, the coefficient of friction was measured after repeating 200 times of the above-mentioned round-trip running under the conditions of 100 g- tension at winding-in side and at the room temperature.

(3) Carrier-to-noise ratio

Since a Carrier-to-noise ratio (hereinafter it is abbreviated to C/N ratio) is considered to be influenced by the surface roughness of the back coat layer, a carrier-to-noise ratio at 7 MHz was examined by using a VHS system VTR type "NV-FS900" manufactured by Matsushita Electric Industrial Co., Ltd. JAPAN. The C/N ratio was expressed in terms of relative value to the C/N ratio of a tape obtained in the Comparison example 1 which was assumed to be 0 dB.

(4) Running durability

After repeating 100 times of running by the VHS system VTR type "NV-FS900" (in a playback state at a running speed of 3.3 cm/sec) of each video tape examples under the condition of 40° C.-80% RH, the shape and damage of the tape were observed.

The result of the observation was defined as follows;

(i) Good: No change of shape such as undulant or crimpling side edges or fold of side edge were observed. Further, neither scratch nor wear was observed.

(ii) Poor; Deformation or change of shape such as undulant or crimpling side edges or fold of side edge was observed. And much scratch and/or wear was observed.

Tables 1 and 2 show results of these evaluation tests as to respective sample tapes.

From results of evaluation tests of the examples, the coefficient of friction shows little temperature dependency, and runability of the examples is excellent. Neither scratch, wear nor deformation is observed, thus excellent durability is obtained.

TABLE 1

| | Featuring components of (a), (b) and (c)[1] | Surface roughness Ra (nm) | Coefficient of friction 3° C. | 23° C. | 40° C. | Stability[2] | C/N ratio (d/B) | Running durability |
|---|---|---|---|---|---|---|---|---|
| Example 1 | (a) SEAHOSTAR type KE-P100 (1.0 μm)<br>(b) Isopropyltriisostearoyltitanate<br>(c) 0.1 parts | 4.50 | 0.15 | 0.14 | 0.14 | 0.15 | 0 | Good |
| Example 2 | (a) SEAHOSTAR type KE-P100 (1.0 μm)<br>(b) Isopropyltriisostearoyltitanate<br>(c) 0.2 parts | 4.80 | 0.14 | 0.14 | 0.14 | 0.14 | −0.1 | Good |
| Example 3 | (a) SEAHOSTAR type KE-P70 (0.7 μm)<br>(b) Isopropyltriisostearoyltitanate<br>(c) 0.3 parts | 4.65 | 0.15 | 0.15 | 0.14 | 0.15 | −0.1 | Good |
| Example 4 | (a) SEBACARB MT (0.67 μm)<br>(b) Isopropyltriisostearoyltitanate<br>(c) 0.6 parts | 4.56 | 0.14 | 0.14 | 0.13 | 0.15 | −0.1 | Good |
| Example 5 | (a) SEBACARB MT (0.67 μm)<br>(b) Isopropyltriisostearoyltitanate<br>(c) 1.5 parts | 5.02 | 0.13 | 0.13 | 0.13 | 0.13 | −0.2 | Good |
| Example 6 | (a) SEBACARB MT (0.67 μm)<br>(b) Isopropyltriisostearoyltitanate<br>(c) 2.5 parts | 5.35 | 0.13 | 0.13 | 0.13 | 0.13 | −0.2 | Good |
| Example 7 | (a) SEBACARB MT (0.67 μm)<br>(b) Myristic acid<br>(c) 0.6 parts | 4.50 | 0.14 | 0.14 | 0.13 | 0.16 | 0 | Good |
| Example 8 | (a) SEBACARB MT (0.67 μm)<br>(b) Myristic acid + 3-aminopropyltriethoxysilane<br>(c) 0.6 parts | 4.44 | 0.14 | 0.14 | 0.13 | 0.15 | 0 | Good |

[1]Featuring components:
(a) Spherical particles (diameter)
(b) Amount of Spherical particles
(c) Surface treatment agent
[2]The value was measured after repeating 200 times of round-trip running under 100 g-tension at winding-in side to the post.

TABLE 2

| | Featuring components of (a), (b) and (c)[1] | Surface roughness Ra (nm) | Coefficient of friction 3° C. | 23° C. | 40° C. | Stability[2] | C/N ratio (d/B) | Running durability |
|---|---|---|---|---|---|---|---|---|
| Comparison example 1 | (a) No spherical particles | 4.01 | 0.26 | 0.25 | 0.25 | 0.48 | 0 | Poor |
| Comparison example 2 | (a) SEAHOSTAR type KE-P30 (0.3 μm)<br>(b) Isopropyltriisostearoyltitanate<br>(c) 0.3 parts | 4.11 | 0.22 | 0.22 | 0.21 | 0.48 | −0.1 | Good |
| Comparison example 3 | (a) SEAHOSTAR type KE-P100 (1.0 μm)<br>(b) Isopropyltriisostearoyltitanate<br>(c) 1.5 parts | 6.23 | 0.13 | 0.13 | 0.13 | 0.14 | −1.3 | Good |
| Comparison example 4 | (a) EPOSTAR type MS (2.0 μm)<br>(b) Isopropyltriisostearoyltitanate<br>(c) 0.1 parts | 7.80 | 0.13 | 0.13 | 0.13 | 0.13 | −1.5 | Good |
| Comparison example 5 | (a) SEBACARB MT (0.67 μm)<br>(b) No surface treatment<br>(c) 0.6 parts | 4.44 | 0.14 | 0.14 | 0.13 | 0.32 | −0.1 | Poor |
| Comparison example 6 | (a) No spherical particles<br>Luricant (n-butyl stearate) was added | 4.10 | 0.24 | 0.19 | 0.22 | 0.35 | 0 | Poor |

[1]Featuring components:
(a) Spherical particles (diameter)
(b) Amount of Spherical particles
(c) Surface treatment agent
[2]The value was measured after repeating 200 times of round-trip running under 100 g-tension at winding-in side to the post.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A magnetic recording medium comprising:
a non-magnetic substrate;
a magnetic layer formed on said non-magnetic substrate; and
a back coat layer including spherical particles which have been previously surface-treated with an agent for giving lubricity, said spherical particles having a diameter in the range of from 0.6 μm to 1.2μ, and the amount of said spherical particles in said back coat layer being in the range of from 0.05 weight % to 0.5 weight % based on the total weight of the back coat layer and the amount of said agent for giving lubricity being in the range of from 0.00025 weight % to 0.15 weight % based on the total weight of the back coat layer.

2. A magnetic recording medium in accordance with claim 1, wherein:

said agent for giving lubricity is at least one member selected from the group consisting of p-[N-(2-aminoethyl)aminoethyl]phenethyltrimethoxysilane; N-(2-aminoethyl)-3-aminopropylmethyldimethoxysilane; N-(2-aminoethyl)-3-aminopropyltrimethoxysilane; 1-(3-aminopropyl)-1,1,3,3,3-pentamethyldiloxane; 3-aminopropyltriethoxylane; 3-aminopropyltris(trimethylsiloxy)silane; γ-(2-aminoethyl)aminopropyltrimethoxysilane; γ-(2-aminoethyl)aminopropylmethyldimethoxysilane; γ-glycidoxypropyltrimethoxysilane; γ-mercaptopropyltrimethoxysilane, isopropyltriisostearoyltitanate; isopropyltris(diocthylpyrophosphate)titanate; isopropyltri(N-aminoethylaminoethyl)titanate; tetraocthylbis(distridecylphosphate)titanate; bis(diocthylpyrophosphate)oxyacetatetitanate; bis(diocthylpyrophosphate)ethylenetitanate; isopropyltrioctanoyltitanate; isopropyltridecylbenzensulfonyltitanate; isopropyltri(diocthylphosphate)titanate; tetraapropylbis(diocytylphosphate)titanate, a lubric acid, a myristic acid, a palmitic acid, a stearic acid, an oleic acid, and a behenic acid.

3. A magnetic recording medium in accordance with claim 1 wherein;

said spherical particles are particles of thermal black which are surface treated with isopropyltriisostearoyltitanate.

4. A magnetic recording medium in accordance with claim 1 wherein;

said spherical particles are particles of silicon dioxide which are surface treated with isopropyltriisostearoyltitanate.

5. A magnetic recording medium in accordance with claim 1 wherein;

said spherical particles are particles of melamine formaldehyde condensation product which are surface treated with isopropyltriisostearoyltitanate.

6. A magnetic recording medium in accordance with claim 1 wherein;

said spherical particles are particles of thermal black which are surface treated with myristic acid.

7. A magnetic recording medium in accordance with claim 1 wherein;

said spherical particles are particles of thermal black which are surface treated with myristic acid and 3-aminopropyltriethoxysilane.

* * * * *